(12) United States Patent
McAlice et al.

(10) Patent No.: US 6,347,510 B1
(45) Date of Patent: Feb. 19, 2002

(54) AXI-NOZZLE EJECTOR SEAL

(75) Inventors: Timothy J. McAlice, Jupiter, FL (US); James Steven Johnson, Shelton, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/215,948

(22) Filed: Dec. 18, 1998

(51) Int. Cl.[7] .............................. F02K 1/06; F02K 1/12
(52) U.S. Cl. ................ 60/271; 239/127.3; 239/265.35; 239/265.39; 239/265.37
(58) Field of Search ................... 60/226.1, 230, 60/271; 239/127.3, 265.17, 265.19, 265.33, 265.35, 265.37, 265.41, 265.43

(56) References Cited

U.S. PATENT DOCUMENTS

| | | | | |
|---|---|---|---|---|
| 2,900,789 A | * | 8/1959 | Philpot | 239/265.39 |
| 2,984,068 A | * | 5/1961 | Eatock | 239/265.39 |
| 3,712,547 A | * | 1/1973 | Smale et al. | 239/265.39 |
| 3,785,567 A | * | 1/1974 | Fisher | 239/265.39 |
| 4,022,948 A | * | 5/1977 | Smith et al. | 239/265.39 |
| 5,522,546 A | * | 6/1996 | Jarvis | 239/265.19 |
| 5,794,851 A | * | 8/1998 | Barcza | 239/127.3 |
| 5,799,874 A | * | 9/1998 | Eigenbrode et al. | 239/127.1 |

* cited by examiner

*Primary Examiner*—Ted Kim

(57) ABSTRACT

A nozzle for a gas turbine engine is provided which includes an outer casing, a convergent section, a divergent section, an external fairing, and a collapsible seal member. The divergent section has an aft end and a forward end, and the forward end of the divergent section is pivotally attached to the convergent section. The external fairing has an aft end and a forward end. The forward end of the external fairing is pivotally attached to the outer casing and the aft end of the external fairing is pivotally attached to the aft end of the divergent section. The external fairing is disposed radially outside of the divergent section. The collapsible seal member extends between the outer casing and the divergent section, circumferentially around and outside of the divergent section.

10 Claims, 1 Drawing Sheet

AXI-NOZZLE EJECTOR SEAL

BACKGROUND OF THE INVENTION

1. Technical Field

This invention relates to gas turbine engines having convergent/divergent nozzles in general, and apparatus for sealing within nozzles in particular.

2. Background Information

An exhaust nozzle provides a means for optimizing thrust produced within a gas turbine engine. In augmented gas turbine engines, convergent/divergent (CID) nozzles are particularly favored because of the multitude of nozzle positions possible. Flaps circumferentially distributed aft of the augmentor form the convergent and divergent sections for which the nozzle is named. Flap seals disposed between adjacent flaps minimize gas leakage between flaps in both sections. The convergent section is pivotally connected to the augmentor and to the divergent section. The divergent section is pivotally connected to the convergent section and to an external fairing positioned radially outside of the divergent section. The opposite end of the external fairing is pivotally attached to a static outer casing which surrounds a portion of the nozzle. Together, the outer casing, the convergent and divergent sections, and the external fairing form a plenum hereinafter referred to as the "nozzle plenum".

Because of the high temperature of the core gas exiting the turbine and augmentor, nozzles are cooled with air bled off of the fan at a lower temperature and a higher pressure than that of the core gas flow passing through the nozzle. Cooling air enters the core gas path within the augmentor via cooling holes in the augmentor liner and subsequently passes into the nozzle as a layer of cooling air traveling along the surface of the nozzle flaps and flap seals. Cooling air within the nozzle plenum cools the opposite side of the flaps and flap seals.

One significant disadvantage of this approach is that the layer of cooling air traveling along the augmentor liner and nozzle increases in temperature as a function of distance traveled. At the same time the temperature increases, the geometry of the layer erodes and further inhibits the ability of the cooling air layer to thermally protect the adjacent augmentor or nozzle component. As a result, adequate cooling air flow for the convergent section may be insufficient for the divergent section. If the cooling air flow is increased to meet the minimum required for the divergent section, an excessive amount would be used to cool the convergent section. A person of skill in the art will recognize that it is a distinct advantage to minimize the amount of bled cooling air used within a gas turbine engine.

To avoid the above described problems, some applications employ cooling air ejectors disposed in the divergent flaps and flap seals. Cooling air from the nozzle plenum passes through the ejectors and either forms a new layer, or augments an existing layer, traveling aft over the divergent flaps and flap seals. This approach improves the cooling layer performance along the divergent section. A problem with this approach, however, is that the cooling air initially produced as fan bypass air encounters numerous pressure drops within the bypass air plenum as it travels aft from the fan to the nozzle. One of the more significant drops occurs in the nozzle plenum, where the cooling air is directed toward the joint between the divergent section and the external fairing.

What is needed is a nozzle that provides adequate cooling for both the convergent and divergent sections and one that uses minimal cooling air.

DISCLOSURE OF THE INVENTION

It is, therefore, an object of the present invention to provide a nozzle that requires minimal cooling air.

It is another object of the present invention to provide a nozzle that adequately cools the divergent flaps and flap seals.

It is still another object of the present invention to provide a sealing apparatus for a nozzle that is effective for multiple nozzle positions.

It is still another object of the present invention to provide a sealing apparatus that is easily manufactured and implemented.

According to the present invention, a nozzle for a gas turbine engine is provided which includes an outer casing, a convergent section, a divergent section, an external fairing, and a collapsible seal member. The divergent section has an aft end and a forward end, and the forward end of the divergent section is pivotally attached to the convergent section. The external fairing has an aft end and a forward end. The forward end of the external fairing is pivotally attached to the outer casing and the aft end of the external fairing is pivotally attached to the aft end of the divergent section. The external fairing is disposed radially outside of the divergent section. The collapsible seal member extends between the outer casing and the divergent section, circumferentially around and outside of the divergent section.

According to one aspect of the present invention, the divergent section includes a plurality of ejector slots through which cooling air may pass. The ejector slots are oriented such that cooling air may pass from the nozzle plenum, through the divergent section, and travel along the surface of the flap as a layer before mixing with the passing core gas flow.

An advantage of the present invention is that it minimizes the volume of cooling air necessary to adequately cool the divergent section of the nozzle. A person of skill in the art will recognize that nozzles having flaps and flap seals are notorious for cooling air leakage. The present invention nozzle, which includes the collapsible seal, limits cooling air leakage within the nozzle plenum, and thereby minimizes the total volume of cooling air necessary. The present invention also minimizes the cooling air volume requirement by enabling the divergent section to be cooled more efficiently. The embodiment using the collapsible seal in combination with the ejector slots in the divergent section avoids having to provide excessive cooling in the convergent section to insure adequate cooling in the divergent section.

Another advantage of the present invention is that it minimizes the amount of work required to provide cooling air to ejector openings disposed in the divergent section. The collapsible seal portion of the present invention minimizes cooling air pressure losses between the fan and the divergent section thereby minimizing the amount of work required to provide the cooling air. A person of skill in the art will recognize that work required to increase the pressure of the cooling air does not add to the thrust of the engine and therefore decreases the efficiency of the engine.

These and other objects, features and advantages of the present invention will become apparent in light of the detailed description of the best mode embodiment thereof, as illustrated in the accompanying drawings.

BEST MODE FOR CARRYING OUT THE INVENTION

Figure 1:
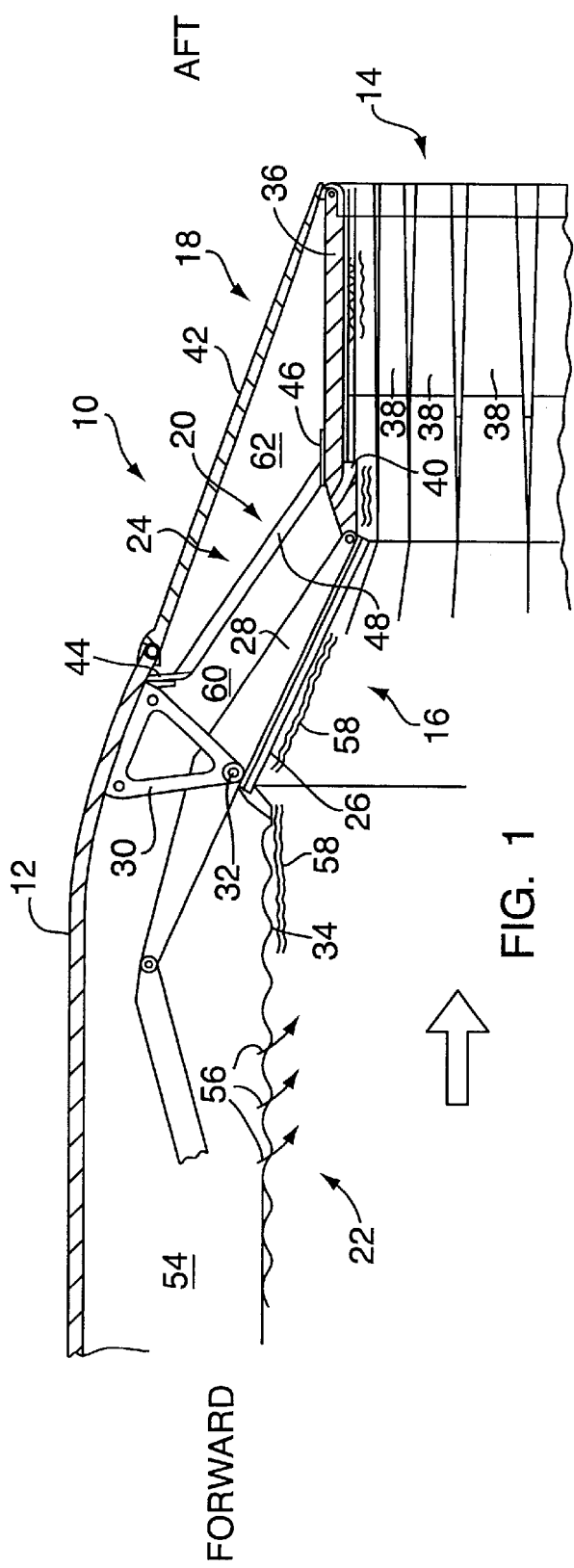
FIG. 1 is a diagrammatic partial view of a gas turbine engine augmentor and nozzle.
Figure 2:
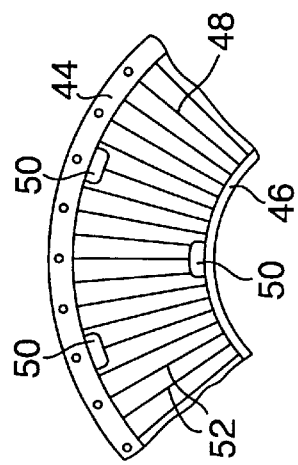
FIG. 2 is a diagrammatic partial view of the collapsible seal of the present invention.

Referring to FIGS. 1 and 2, a nozzle 10 for a gas turbine engine is shown having an outer casing 12, a divergent section 14, a convergent section 16, an exterior fairing 18, and a collapsible seal 20. An augmentor 22 is partially shown forward of the nozzle 10 contiguous with the convergent section 16. The convergent section 16 of the nozzle 10 is forward of the divergent section 14 and the intersection between the two sections 14,16 forms the throat of the convergent/divergent nozzle 10. The outer casing 12 is a static structure that surrounds the augmentor 22 and a portion of the nozzle 10. The annular region 24 bounded by the convergent section 16, the divergent section 14, and the external fairing 18 is referred to as the nozzle plenum 24.

The convergent section 16 of the nozzle 10 includes a plurality of convergent flaps 26 and convergent flap seals (not shown) circumferentially distributed aft of the augmentor 22. The convergent section 16 is attached to pivotable linkages 28 which are attached to brackets 30 mounted on the outer casing 12. The pivot point 32 of each linkage 28 is adjacent the intersection between the augmentor liner 34 and the convergent section 16. The position of the linkage pivot points 32 enables the convergent section 16 to pivot relative to the augmentor liner 34 as though it was pivotally attached to the augmentor liner 34. The divergent section 14 includes a plurality of divergent flaps 36 and divergent flap seals 38 circumferentially distributed aft of the convergent section 16. The divergent section 14 is pivotally attached to the linkages 28 supporting the convergent section 16. The opposite end of the divergent section 14 is pivotally attached to the exterior fairing 18. In one embodiment, each divergent flap 36 and flap seal 38 includes a cooling air passage 40 usually in the form of a slot, commonly referred to as an "ejector slot" 40. The exterior fairing 18 includes a plurality of exterior flaps 42 and exterior flap seals (not shown) arranged in a manner similar to that of the divergent section flaps 36 and flap seals 38. The aft end of the exterior fairing 18 is pivotally attached to the divergent section 14. The forward end of the exterior fairing 18 is pivotally attached to the outer casing 12.

The collapsible seal 20 includes an outer case mounting flange 44, a divergent section mounting flange 46, and a collapsible member 48 extending therebetween (see FIG. 2). The collapsible member 48 consists essentially of a pliable material that collapses sufficiently in compression to accommodate nozzle movement. The term "collapsible" is used to describe the member's ability to fold or to bend to accommodate all possible nozzle 10 positions and configurations. In one embodiment, the collapsibility of the member 48 is augmented with mechanical features 52 that improve the member's ability to fold or bend. Pleats or corrugations are examples of mechanical features 52 that may be used to augment the collapsibility of the member 48. A plurality of metering orifices 50 are disposed in the collapsible seal 20 to permit the passage of cooling air through the seal 20. Alternatively, metering orifices could be formed between outer case structure 12 and the outer case mounting flange 44, or between the divergent section 14 and the divergent section mounting flange 46. In a preferred embodiment, the collapsible member 48 includes a fabric made from aramid or similar type fibers. A fabric made from Kevlar™, an E. I. DuPont Company product, is an acceptable aramid type fabric. In the most preferred embodiment, the aramid fabric is impregnated with a RTV (room temperature vulcanizing) type silicon-rubber composite product. The RTV silicon product provides a sealing function. That impedes the flow of core gas through the fabric.

Referring to FIG. 1, in the operation of the engine cooling air at a lower temperature and higher pressure than the core gas flow is bled off of the fan and passed into the annulus 54 formed between the augmentor liner 34 and the outer casing 12. A percentage of the cooling air bleeds out of the annulus 54 through the apertures 56 in the augmentor liner 34 and forms a layer 58 of cooling air traveling aft along the augmentor liner 34. The layer 58 continues aft passing over the convergent section 16, transferring heat away from the convergent section 16 along the way. The cooling air that does not enter the augmentor 22 continues aft into the nozzle plenum 24. The collapsible seal 20 divides the nozzle plenum 24 into a forward region 60 and an aft region 62. The cooling air first enters the forward region 60 and is inhibited from moving into the aft region 62 by the collapsible seal 20, except through the metering orifices 50 (see FIG. 2) disposed within (or adjacent) the collapsible seal 20. The advantage here is that only that volume of cooling air that is necessary to cool the aft region 62 is allowed to enter the aft region 62. Consequently, the volume of cooling air used is minimized.

In the embodiment which includes ejector slots 40 disposed within the divergent section, cooling air passes from the forward region 60 through the ejector slots 40 to augment an existing cooling air layer, or to establish a new cooling air layer, aft of the slot along the surface of the divergent flap 36 or flap seal 38. The advantage of using the collapsible seal 20 in this embodiment is two-fold. First, the collapsible seal 20 minimizes cooling air use as described above. Second, the collapsible seal 20 minimizes pressure losses for that cooling air which enters the nozzle 10 via the ejector slots 40.

Although this invention has been shown and described with respect to the detailed embodiments thereof, it will be understood by those skilled in the art that various changes in form and detail thereof may be made without departing from the spirit and the scope of the invention.

We claim:

1. A nozzle for a gas turbine engine, said nozzle comprising:
    an outer casing;
    a convergent section;
    a divergent section, having an aft end and a forward end, said forward end pivotally attached to said convergent section;
    an external fairing, having an aft end and a forward end, said forward end pivotally attached to said outer casing and said aft end pivotally attached to said aft end of said divergent section, wherein said external fairing is disposed radially outside of said divergent section; and
    a collapsible seal, extending between and connected to said outer casing and said divergent section, circumferentially around and outside of said divergent section, wherein said seal is collapsible to accommodate movement of the nozzle.

2. A nozzle for a gas turbine engine according to claim 1, wherein said collapsible seal includes a collapsible member with aramid fibers.

3. A nozzle for a gas turbine engine according to claim 2, wherein said collapsible member is impregnated with RTV silicon-rubber composite.

4. A nozzle for a gas turbine engine according to claim 1, wherein said divergent section comprises a plurality of ejector slots.

5. A nozzle for a gas turbine engine according to claim 4, wherein said collapsible seal attaches to said divergent section aft of said ejector slots.

6. A nozzle for a gas turbine engine according to claim 5, wherein said collapsible seal includes a collapsible member with aramid fibers.

7. A nozzle for a gas turbine engine according to claim 6, wherein said collapsible member is impregnated with RTV silicon-rubber composite.

8. A collapsible seal for use in a gas turbine engine nozzle, between the outer casing of the engine and a divergent section of the nozzle, said collapsible seal comprising:

a first mounting flange for connection to the outer casing of the engine;

a second mounting flange for connection to the divergent section of the nozzle; and a collapsible member, extending between said first and second mounting flanges, wherein said seal is collapsible to accommodate movement of the nozzle.

9. A collapsible seal according to claim 8, wherein said collapsible member comprises aramid fibers.

10. A collapsible seal according to claim 9, wherein said collapsible member is impregnated with RTV silicon-rubber composite.

\* \* \* \* \*